Apr. 17, 1923. 1,451,997

A. G. M. MICHELL

HYDRAULIC MECHANISM FOR THE TRANSMISSION OF POWER

Filed Jan. 5, 1921

Inventor
Anthony G. M. Michell.
By [signature] Atty.

Patented Apr. 17, 1923.

1,451,997

UNITED STATES PATENT OFFICE.

ANTHONY G. M. MICHELL, OF MELBOURNE, VICTORIA, AUSTRALIA.

HYDRAULIC MECHANISM FOR THE TRANSMISSION OF POWER.

Application filed January 5, 1921. Serial No. 435,168.

*To all whom it may concern:*

Be it known that I, ANTHONY GEORGE MALDON MICHELL, of 450 Collins Street, Melbourne, in the State of Victoria, Australia, have invented certain new and useful Improvements in Hydraulic Mechanism for the Transmission of Power, of which the following is a specification.

The present invention is an application of hydraulic transmission mechanism of the type comprising an outward flow centrifugal pump as driving element and an inward flow reaction turbine as driven element, to transmit the power of more than one prime mover to a single shaft.

A particular object of the invention is the driving of marine propeller shafts, especially in cases where the power required to be applied to a single propeller is greater than can be conveniently generated by a single engine, and where it is desired to drive the propeller at a speed different from that of the engines. Another object of the invention is facility for varying the speed of the driven shaft, e. g. a propeller shaft, or for reversing its motion, without interference with the running of the engines, and without the wear and tear and risks of fracture involved in the use of toothed gears at variable speed ratios and high power.

According to the present invention these objects are secured by an arrangement of the centrifugal pump elements in lateral relationship and so associated with a centrally located turbine that the fluid from the former circulates through the latter.

In the preferred construction the turbine is divided into circumferential sectors each associated with a separate pump element, and to effect the reversal and control object above stated, the rotor of the turbine is also divided into separate axially adjacent compartments, and an axially movable element is provided adapted to direct the admission of the motive fluid radially into one or to deflect its axially into another of said compartments.

The accompanying drawings illustrate a practical application of this invention to hydraulic transmission of the type specified.

Fig. 3 is a sectional plan view of the whole of the mechanism, adjusted for forward driving, while

Figures 1, 2:
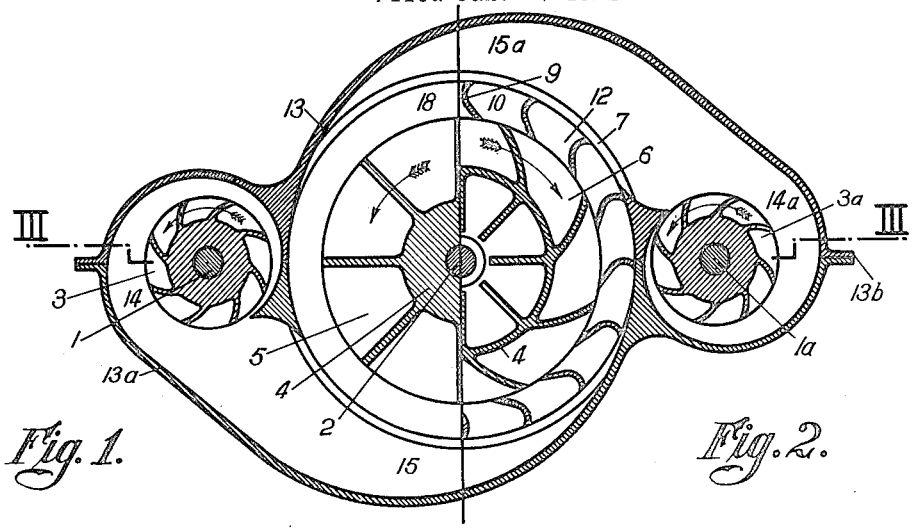
Fig. 1 shows a cross-section of one-half of the mechanism on the line 1, 1 of Fig. 3.
Fig. 2 is a similar cross-section of the other half of the mechanism on the broken line 11, 11 of Fig. 4.

The drawings illustrate the application of the invention for the transmission of power from two parallel driving shafts, 1, $1^a$, arranged to be directly coupled to two independent engine-shafts not shown, to a single driven propeller shaft 2. The driving shafts 1, $1^a$ have mounted on them respectively centrifugal pump-impellers 3, $3^a$, each of which is of the symmetrical or double entrance type.

The driven shaft 2 has mounted on it a turbine rotor 4, of inward flow type, and comprising three separate compartments viz a middle compartment 5 for forward running and two outer compartments 6, $6^a$ for reverse running. Each of the compartments is of the mixed-flow type, and fluid entering radially at the periphery and being discharged axially.

Figure 3:
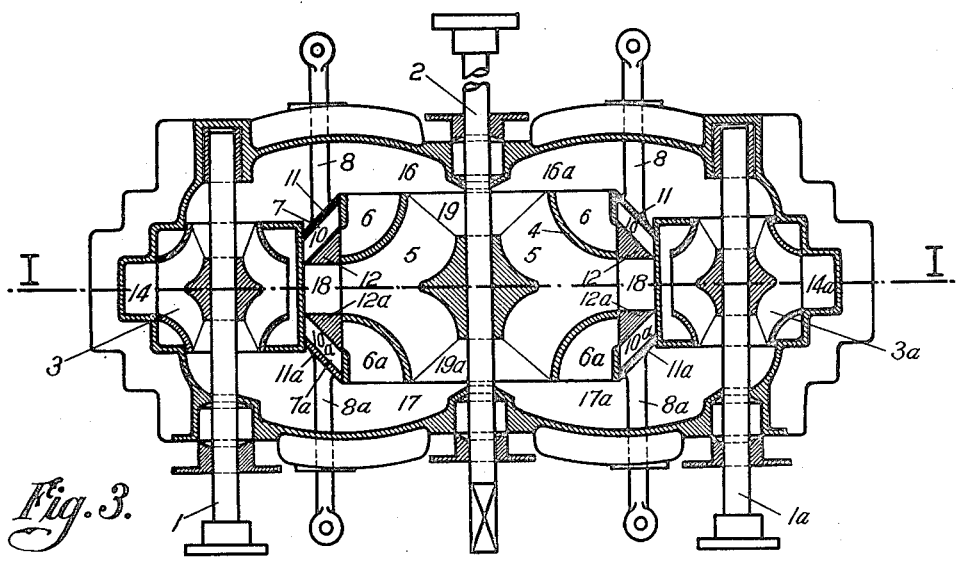
Figure 4:
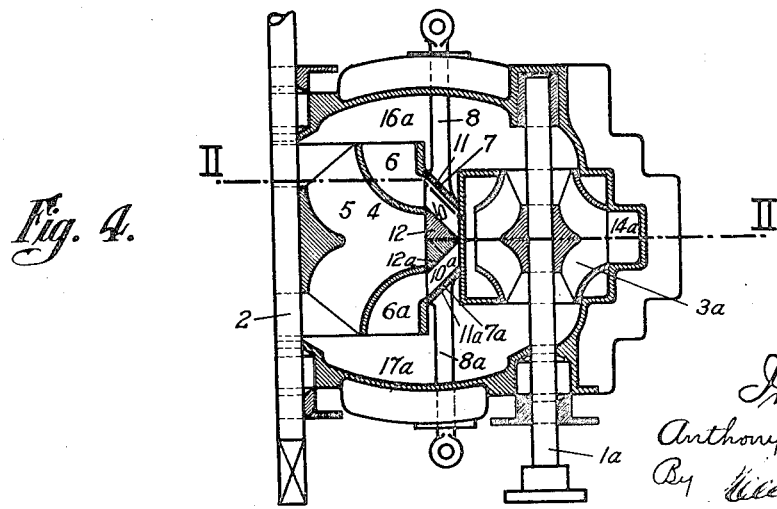
Fig. 4 is a part sectional plan of a portion of the mechanism set for reverse driving.

Surrounding the turbine rotor 4 are a pair of annular gates 7, $7^a$, each of which can be moved axially by means of the rods 8, $8^a$, and suitable external gear (not shown) from the position shown in Fig. 3 to that shown in Fig. 4. Each annular gate, 7, $7^a$, comprises a series of curved guide vanes, 9, arranged in radially inclined annular passages, 10, $10^a$, and between annular plates or rings, 11, $11^a$, 12, $12^a$, the two latter plates being of a triangular cross-section.

The whole of the hydraulic mechanism above described is immersed in fluid which is enclosed in a common casing divided into two parts 13, $13^a$, on a plane joint $13^b$ for convenience of assembly and inspection. The chamber is formed with helical waterways 14, $14^a$ respectively surrounding the pump-impellers 3, $3^a$, and respectively connected with the helical chambers 15, $15^a$ which respectively surround the upper and lower half peripheries of the turbine rotor 4, this arrangement not constituting any part of the present invention. These helical chambers constitute the preferred form of passage-way for the motive fluid from the pump elements to the turbine. The return passage-ways 16, $16^a$, 17, $17^a$, each connect one half of one axial outlet of the turbine rotor to an axial inlet of one of the pump-impellers.

The operation of the mechanism is as follows:—When in action the engine shafts and pump-impellers 3, $3^a$ coupled thereto rotate continuously in the direction shown by the arrows in Figs. 1 and 2. With the gates 7, 7ª, sets in the forward position as shown in Figs. 1 and 3, the fluid enclosed in the casing 13, 13ª is circulated outward from each of the pump-impellers 3, 3ª through the chambers 14, 15 and 14ª, 15ª, to the annular space 18 between the plates 12, 12ª and thence through the compartment 5 of the pump-rotor, and its symmetrical axial outlets 19, 19ª to the turn passages 16, 16ª, 17 17ª, back to the axial inlets of the pump-impellers.

In passing through the turbine rotor 4 the fluid impels it to rotate in the same direction as the pump-impellers as shown by the arrow in Fig. 1.

When the annular gates 7, 7ª, are shifted to the position for reverse driving of the turbine as shown in Fig. 4 the fluid supplied from the helical chambers 15, 15ª enters the inclined annular passages 10, 10ª and is deflected into the reverse compartments 6, 6ª of the turbine rotor 4, and thence through their respective axial outlets through the passages 16, 16ª, 17, 17ª back to the pump-impellers 3, 3ª, as in the case of forward running. It will be observed that in the position for forward running the inner peripheral surfaces of the rings 12, 12ª cover, or blind, the inlets to the reverse compartments 6, 6ª, of the turbine rotor 4, in the position for reverse running they similarly cover the inlet to the reverse compartment 5, whereby in each case any pumping action of the compartment or compartments not in action, and deleterious fluid resistances, are obviated.

It will be understood that the above described construction, by which the pumps and turbines are made symmetrical about the transverse centre line of Fig. 3 is a matter of convenience only, and that single entry pumps and turbine compartments corresponding substantially to the parts shown on one side only of such centre line could be employed without departing from the principles of the invention.

I claim:—

1. In hydraulic transmission gear of the type described, a turbine element comprising a rotor divided into separate axially adjacent compartments and an axially movable control gate adapted to admit the motive fluid alternatively either radially into one of said compartments of the rotor or to deflect it axially into another adjacent compartment for the purpose described.

2. In hydraulic transmission gear of the type described, comprising a turbine rotor with axially adjacent compartments, a control gate having an inclined annular passage, and adapted to direct the motive fluid to one or another compartment, of the turbine rotor.

3. In hydraulic transmission gear of the type described, comprising a turbine rotor with two axially adjacent axial compartments, a control gate having an inclined annular passage and an annular ring, the said passage being adapted alternatively to direct the motive fluid to either of said compartments, while the ring covers the other of said compartments.

4. In hydraulic transmission gear of the type described, a pair of symmetrical, double-inlet, centrifugal pump-impellers arranged to deliver fluid under pressure to a symmetrical turbine rotor, the said rotor being divided into separate axially adjacent compartments for forward and reverse running and having symmetrical discharge outlets adapted to return the fluid equally to the two inlets of each pump-impeller.

Dated this 23rd day of November, 1920.

A. G. M. MICHELL.